United States Patent
Suzuki et al.

(10) Patent No.: US 7,552,786 B2
(45) Date of Patent: Jun. 30, 2009

(54) IN-WHEEL MOTOR SYSTEM

(75) Inventors: Yasuhiro Suzuki, Tokyo (JP); Katsumi Tashiro, Tokyo (JP); Takashi Nozaki, Shizuoka (JP); Hiroyuki Hakamata, Shizuoka (JP); Keisuke Sone, Shizuoka (JP)

(73) Assignees: Kabushiki Kaisha Bridgestone, Tokyo (JP); NTN Corporation, Osaka (JP)

( * ) Notice: Subject to any disclaimer, the term of this patent is extended or adjusted under 35 U.S.C. 154(b) by 384 days.

(21) Appl. No.: 10/583,872

(22) PCT Filed: Dec. 22, 2004

(86) PCT No.: PCT/JP2004/019240

§ 371 (c)(1),
(2), (4) Date: Jun. 21, 2006

(87) PCT Pub. No.: WO2005/061256

PCT Pub. Date: Jul. 7, 2005

(65) Prior Publication Data

US 2007/0144801 A1    Jun. 28, 2007

(30) Foreign Application Priority Data

Dec. 22, 2003    (JP) .............................. 2003-425668

(51) Int. Cl.
*B60L 8/00*    (2006.01)
*B60K 1/00*    (2006.01)

(52) U.S. Cl. .................................. 180/65.51; 301/6.91

(58) Field of Classification Search ................. 180/19.3, 180/65.1, 65.5, 6.5, 60, 65.51, 907, 601; 301/6.91, 136, 67 R, 154.05, 255, 268, 6.1, 301/6.5; 310/90, 268, 89, 91, 179, 67 A
See application file for complete search history.

(56) References Cited

U.S. PATENT DOCUMENTS

| | | | | |
|---|---|---|---|---|
| 3,566,165 | A * | 2/1971 | Lohr | 310/67 R |
| 5,468,055 | A * | 11/1995 | Simon et al. | 301/6.91 |
| 5,927,414 | A * | 7/1999 | Kan et al. | 180/19.3 |
| 6,364,078 | B1 * | 4/2002 | Parison et al. | 301/136 |
| 6,664,692 | B1 * | 12/2003 | Kristoffersen | 310/179 |
| 6,765,327 | B2 * | 7/2004 | Hashimoto et al. | 310/90 |
| 7,121,367 | B2 * | 10/2006 | Ajiro et al. | 180/65.5 |
| 7,306,065 | B2 * | 12/2007 | Nagaya | 180/65.5 |

FOREIGN PATENT DOCUMENTS

| | | | |
|---|---|---|---|
| JP | 2-113123 A | 4/1990 | |
| JP | 7-279987 A | 10/1995 | |
| WO | WO 2002/083446 A1 | 10/2002 | |

* cited by examiner

*Primary Examiner*—Hau V Phan
(74) *Attorney, Agent, or Firm*—Sughrue Mion, PLLC (57) ABSTRACT

A rotating side case supporting the rotor of an in-wheel motor and a wheel or a hub are interconnected by a flexible coupling which comprises a motor-side plate and a wheel-side plate having a plurality of grooves and a plurality of grooves formed on their opposed surfaces in the circumferential direction at an angle of 45° from the radial direction of the plates and extending in directions orthogonal to each other, respectively, small balls sandwiched between the grooves and in such a manner that they can slide, and an intermediate plate interposed between the above plates and having guide holes for guiding the small balls in a direction orthogonal to the radial direction of the plates and which has a small number of parts and is easily assembled.

2 Claims, 7 Drawing Sheets

IN-WHEEL MOTOR SYSTEM

BACKGROUND OF THE INVENTION

1. Field of the Invention

The present invention relates to an in-wheel motor system for use in a vehicle having direct drive wheels as drive wheels.

2. Description of the Prior Art

It is generally known that, in a vehicle having a suspension mechanism such as a spring around a wheel, as the mass of parts under the spring such as a wheel, knuckle and suspension arm, so-called "unsprung mass" increases, changes in the ground holding force of a tire when running on an uneven road become larger, thereby deteriorating road holding properties.

In a vehicle driven by a motor such as an electric car, an in-wheel motor system incorporating a motor in a wheel is being employed. However, in a conventional in-wheel motor whose non-rotating part is fixed to a spindle shaft connected to a part such as an upright or knuckle which is one of the parts around a wheel of the vehicle and whose rotor as a rotating part can rotate together with the wheel, the above unsprung mass increases by the weight of the in-wheel motor, whereby changes in the ground holding force of the tire become large, thereby deteriorating road holding properties (refer to patent documents 1 to 3, for example).

Figure 6:
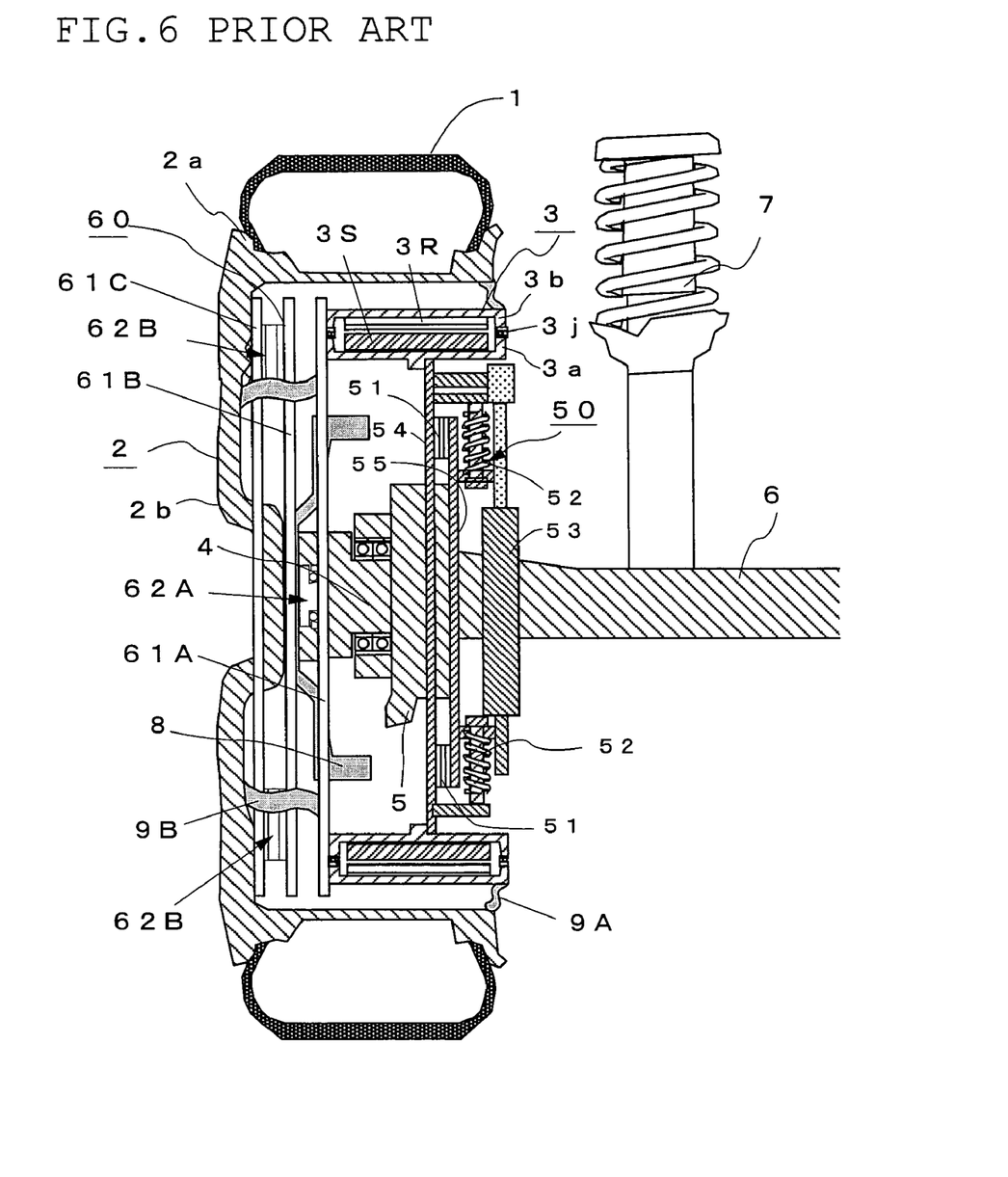
FIG. 6 is a diagram showing the constitution of a conventional in-wheel motor of the prior art.

To solve the above problem, there is proposed an in-wheel motor system as shown in FIG. 6 in which a non-rotating side case 3a supporting a stator 3S is elastically supported to a knuckle 5 as a part around the wheel of a vehicle by a buffer mechanism 50 having two plates 54 and 55 whose moving directions are limited to the vertical direction of the vehicle by direct-acting guides 51 and which are interconnected by springs 52 and a damper 53 moving in the vertical direction of the vehicle and a rotating side case 3b supporting a rotor 3R and a wheel 2 are interconnected by a flexible coupling 60 as a drive force transmission mechanism which can become eccentric in the radical direction of the wheel 2 (refer to patent document 4, for example).

Figure 7:
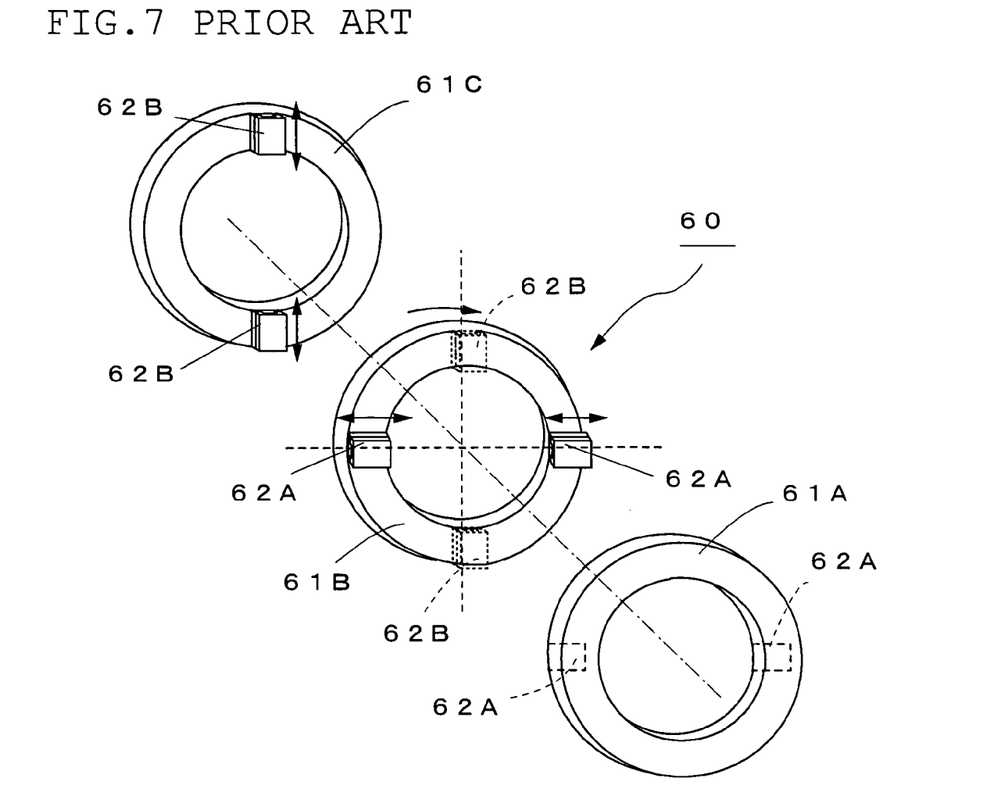
FIG. 7 is a diagram showing the constitution of a conventional flexible coupling of the prior art.
Figure 8:
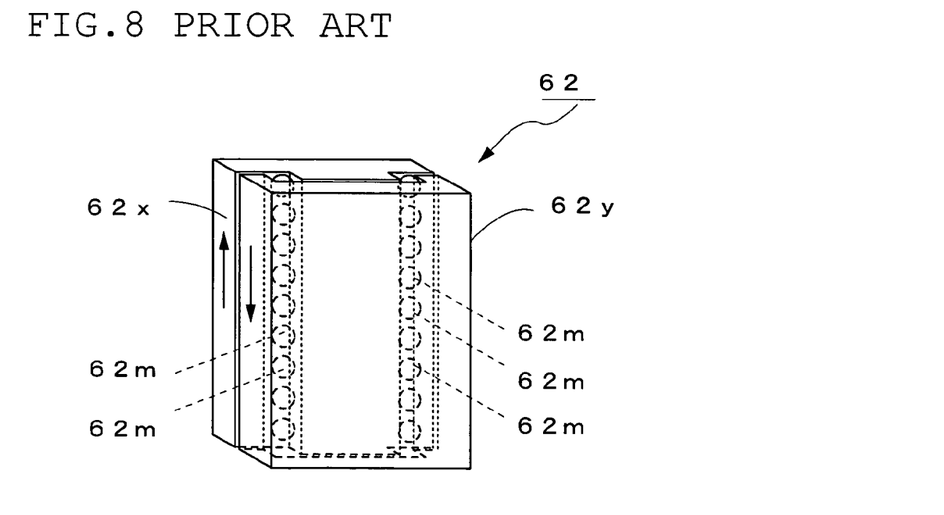
FIG. 8 is a diagram showing an example of a direct-acting guide.

More specifically, as shown in FIG. 7, the above flexible coupling 60 comprises a plurality of hollow disk-like plates 61A to 61C and direct-acting guides 62A and 62B for interconnecting between the adjacent plates 61A and 61B and between the adjacent plates 61B and 61C and guiding the above adjacent plates 61A and 61B and the adjacent plates 61B and 61C in the radial direction of the disk. As shown in FIG. 8, each of the above direct-acting guides 62A and 62B comprises a guide rail 62x having a projection extending in the radial direction of the above plates 61A to 61C, a guide member 62y having a recess extending in the radial direction of the above plates 61A to 61C to be engaged with the above guide rail 62x, and a plurality of steel balls 62m interposed between the projection of the above guide rail 62x and the recess of the guide member 62y to smoothly slide the above guide rail 62x and the guide member 62y.

Since the above guide rail 62x and the guide member 62y slide so as to guide the above adjacent plates 61A and 61B and the adjacent plates 61B and 61C in the radial direction of the disk, the in-wheel motor 3 can move in the working direction of the above direct-acting guides 62A and 62B, that is, the radial direction of the disk but not in the rotation direction. Therefore, by connecting the rotating side case 3b of the motor 3 to the wheel 2 by the above flexible coupling 60, drive torque can be transmitted from the motor 3 to the wheel 2 efficiently.

In the in-wheel motor system constituted as described above, the in-wheel motor 3 is elastically supported to the knuckle 5 which is a part around the wheel of a vehicle to be float mounted to the part by the above buffer mechanism 50 so that the motor 3 itself can be used as the weight of a dynamic damper, thereby making it possible to improve ground holding performance and riding comfort when running on a bad road. Since the motor shaft and the wheel shaft are interconnected by the above flexible coupling 60 in such a manner that they can become eccentric to each other in any direction, torque can be transmitted from the motor 3 to the wheel 2 efficiently.

In the above method, the motor 3 vibrates in the vertical direction independently of the parts around the wheel of the vehicle, a certain measure of spacing is required between the motor 3 and the wheel 2. Therefore, when the vehicle runs on a graveled road and gravel enters this spacing, the motor may be damaged by the vibration of the motor 3 in the wheel 2. To cope with this, the present applicant proposes a method for preventing the entry of a stone or dust into the above spacing by blocking the spacing between the above motor 3 and the wheel 2 from the outside with a first annular dust boot 9A having a wavy section in the direction perpendicular to the shaft and the deformation of a coupling portion by a stepping stone or the entry of dust into the direct-acting guides 62A and 62B by forming a barrier on the inner side of the flexible coupling 60 with a second annular dust boot 9B as shown in FIG. 6 (Japanese Patent Application No. 2002-251401).

Patent document 1: Japanese Patent No. 2676025

Patent document 2: Japanese Examined Patent Publication No. 9-506236

Patent document 3: Japanese Unexamined Patent Application No. 10-305735

Patent document 4: WO 02/083446 A1

SUMMARY OF THE INVENTION

Although the above flexible coupling 60 can transmit the drive torque of the motor 3 to the wheel 2 efficiently, as it has a large number of parts and comprises the direct-acting guides 62A and 62B which require high assembly accuracy, it takes long to mount the above direct-acting guides 62A and 62B to the above plates 61A to 61C, thereby reducing productivity. Further, since the above direct-acting guides 62A and 62B are expensive, the whole system costs dear.

Although grease is filled into the above direct-acting guides 62A and 62B to smoothen their movements and the above dust boots 9A and 9B can prevent the entry of a stone or dust from the outside, the above grease may leak out into the motor 3 from the periphery of the flexible coupling 60.

It is an object of the present invention which has been made in view of the above problem of the prior art to provide an in-wheel motor system capable of transmitting the drive torque of a motor to a wheel very efficiently with simple constitution and comprising a flexible coupling which is easily assembled.

According to a first aspect of the present invention, there is provided an in-wheel motor system having a hollow direct drive motor which is provided in a wheel and whose stator side is supported to a part around the wheel of a vehicle by elastic bodies and/or an attenuation mechanism, wherein a motor rotor and a wheel or a hub are interconnected by a coupling mechanism which comprises two hollow disk-like plates having a plurality of grooves formed on their opposed surfaces in the circumferential direction at an angle of 45° from the radial direction of the plates and extending in directions orthogonal to each other, small balls sandwiched between the grooves in such a manner that they can slide, an intermediate plate interposed between the hollow disk-like plates and having guide holes for guiding the small balls in a direction orthogonal to the radial direction of the plates.

According to a second aspect of the present invention, there is provided an in-wheel motor system which comprises an elastic annular dust boot for storing a slide mechanism having the above small steels, grooves and guide holes.

According to the present invention, the rotor of a hollow direct drive motor provided in a wheel and the wheel or the hub are interconnected by a coupling mechanism which comprises two hollow disk-like plates having a plurality of grooves formed on their opposed surfaces in the circumferential direction at an angle of 45° from the radial direction of the plates and extending in directions orthogonal to each other, small balls sandwiched between the grooves in such a manner that they can slide, and an intermediate plate interposed between the hollow disk-like plates and having guide holes for guiding the small balls in a direction orthogonal to the radial direction of the plates and which is simple in structure and has a small number of parts. Therefore, even when the motor shaft and the wheel shaft become eccentric with each other, the drive torque of the motor can be transmitted to the wheel without fail and the motor is easily assembled, thereby making it possible to improve work efficiency.

Since the elastic annular dust boot for storing a slide mechanism having the above small balls, groove and guide holes is provided, the entry of dust and water into the above slide mechanism and the diffusion of grease filled into the slide portions of the above slide mechanism to the outside can be prevented effectively.

DETAILED DESCRIPTION OF THE PREFERRED EMBODIMENTS

Preferred embodiments of the present invention will be described hereinunder with reference to the accompanying drawings.

Embodiment 1

Figure 1:
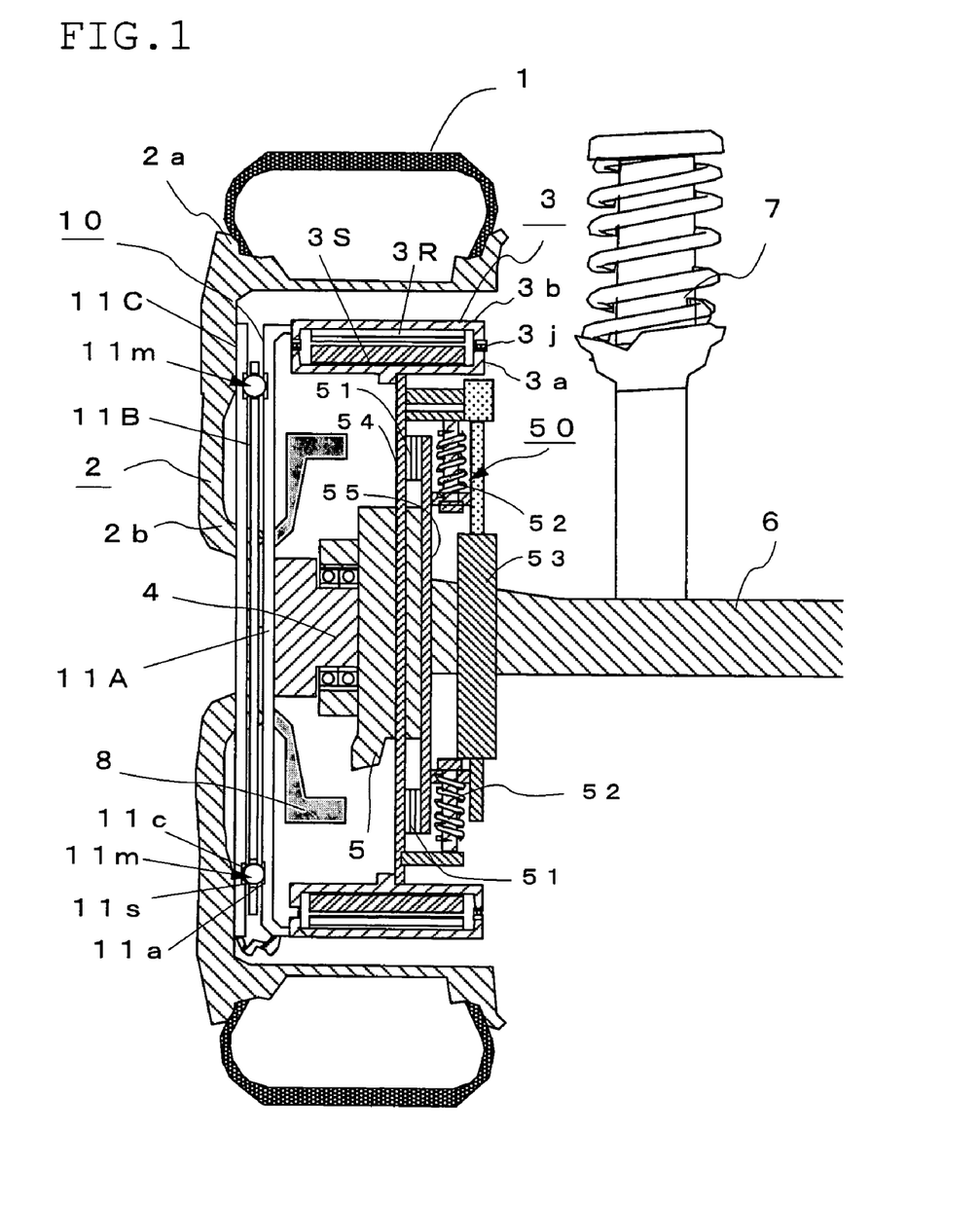
FIG. 1 is a longitudinal sectional view showing the constitution of an in-wheel motor system according to Embodiment 1 of the present invention.

FIG. 1 shows the constitution of an in-wheel motor system according to Embodiment 1 of the present invention. In FIG. 1, reference numeral 1 denotes a tire, 2 a wheel consisting of a rim 2a and a wheel disk 2b, and 3 an outer rotor type in-wheel motor which comprises a stator 3S fixed to a non-rotating side case 3a arranged on the inner side in the radial direction and a rotor 3R fixed to a rotating side case 3b rotatably connected to the above non-rotating side case 3a through a bearing 3j and arranged on the outer side in the radial direction.

Numeral 4 denotes a hub connected to the wheel 2 at its rotary shaft, 5 a knuckle connected to an axle 6, 7 a suspension member composed of a shock absorber, 8 a brake unit composed of a brake disk mounted to the above hub 4, 10 a small ball slide type flexible coupling for connecting the rotating side case 3b to the wheel 2, and 50 a buffer mechanism for elastically supporting the non-rotating side case 3a supporting the stator 3 to the knuckle 5 as a part around the wheel of the vehicle, comprising two plates 54 and 55 whose moving directions are limited to the vertical direction of the vehicle by direct-acting guides 51 and which are interconnected by springs 52 and a damper 53 moving in the vertical direction of the vehicle.

Figure 2A:
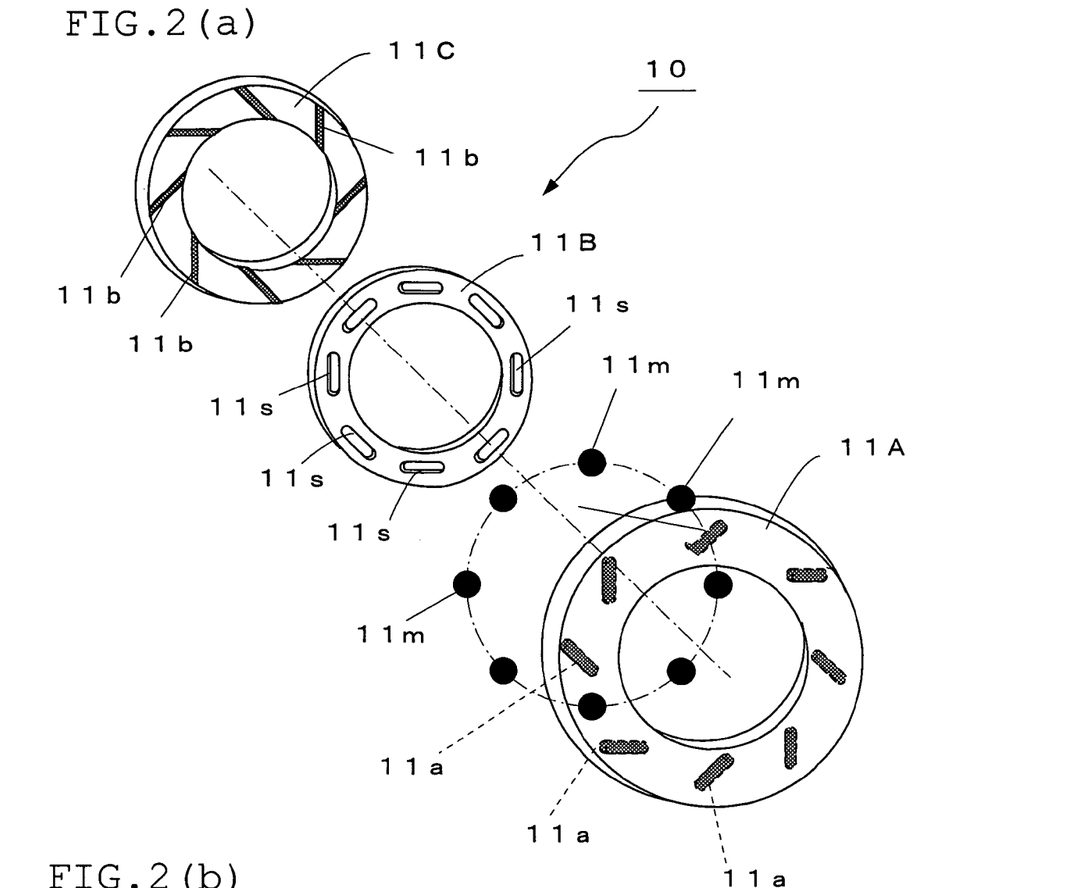
FIGS. 2(a) and 2(b) are diagrams showing the constitution of a flexible coupling according to Embodiment 1.
Figure 2B:
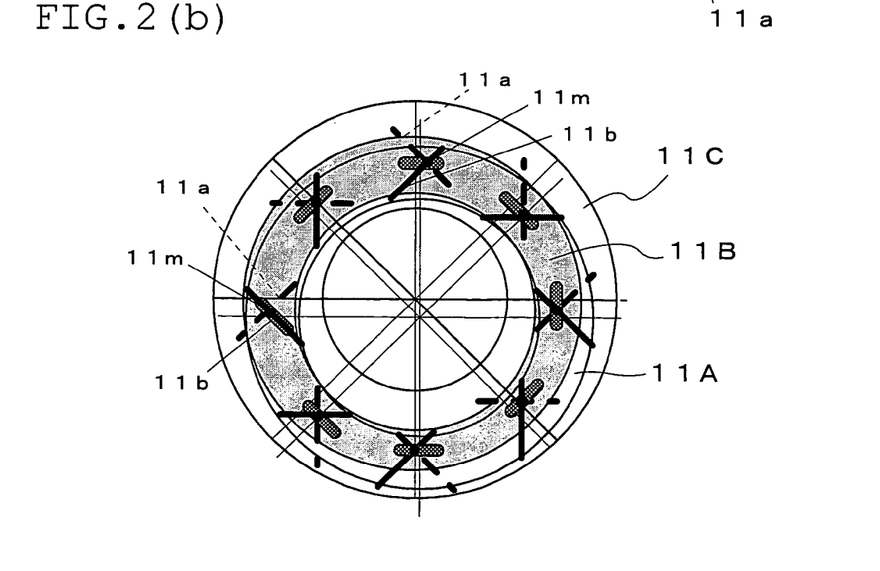

As shown in FIGS. 2(a) and 2(b), the above flexible coupling 10 comprises a hollow disk-like motor-side plate 11A attached to the rotating side case 3b of the motor, a hollow disk-like wheel-side plate 11C attached to the wheel 2, small steel balls 11m sandwiched between a plurality of grooves 11a and a plurality of grooves 11b formed in the respective plates 11A and 11C in such a manner that they can slide, an intermediate plate 11B interposed between the above plates 11A and 11C and having guide holes 11s for guiding the above small balls 11m in a direction orthogonal to the radial direction of the above plates 11A and 11C and transmits drive torque from the motor 3 to the wheel 2. The above grooves 11a are formed on the surface opposed to the above wheel-side plate 11C of the above motor-side plate 11A at an angle of 45° from the radial direction of the above plate 11A whereas the above grooves 11b are formed on the surface opposed to the above motor-side plate 11A of the above wheel-side plate 11C in directions orthogonal to the extension directions of the above grooves 11a. Thereby, the small balls 11m can move in any direction between the above motor-side plate 11A and the wheel-side plate 11C.

When torque from the rotating side case 3b of the in-wheel motor 3 is transmitted to the wheel-side plate 11C connected to the wheel 2 through the motor-side plate 11A in the above constitution, the above small balls 11m rotate in the circumferential direction and try to move in a direction at an angle of 45° from the radial direction along the grooves 11a. Meanwhile, the above small balls 11m rotate with the rotation of the motor 3 and can move between the motor-side plate 11A and the wheel-side plate 11C in all directions as they are also stored in the grooves 11b formed in the wheel-side plate 11C in directions orthogonal to the above grooves 11a and their moving directions are limited by the guide holes 11s. Thereby, even when the motor shaft and the wheel shaft become eccentric to each other due to the vibration of the motor at the time of running on a bad road, the above motor-side plate 11A and the wheel-side plate 11C can move in all directions to absorb eccentricity between the motor 3 and the wheel 2, thereby making it possible to transmit drive torque from the motor 3 to the wheel 2 smoothly.

According to this Embodiment 1, the in-wheel motor 3 and the wheel 2 are interconnected by the flexible coupling 10 which comprises the motor-side plate 11A and the wheel-side plate 11C having a plurality of grooves 11a and a plurality of grooves 11b formed on their opposed surfaces at an angle of 45° from the radial direction of the plates and extending in directions orthogonal to each other, respectively, the small balls 11m sandwiched between the grooves 11a and 11b in such a manner that they can slide, and the intermediate plate 11B having guide holes 11s for guiding the above small balls 11m in a direction orthogonal to the radial direction. Therefore, the drive torque of the motor 3 can be transmitted to the wheel 2 with simple constitution. Since the flexible coupling 10 of the present invention has a small number of parts and is easily assembled, the assembly efficiency of the in-wheel motor 3 can be enhanced and productivity can be improved.

In the above Embodiment 1, the wheel-side plate 11C is directly connected to the wheel 2. When the wheel-side plate 11C is connected to the hub 4 connected to the wheel 2 at its rotary shaft, the same effect can be obtained.

In the above embodiment, 8 small balls 11m which move in the radial direction of the plates 11A to 11C are used. The present invention is not limited to this. 2, 3 or 5 or more balls may be used. The guide holes 11s for guiding the above small balls 11m and the grooves 11a and 11b are preferably arranged at equal distances in the circumferential directions of the plates 11A to 11C, respectively.

In the above embodiment, the hollow disk-like plates are used as the plates 11A to 11C. The plates 11A to 11C do not need to have a disk-like shape if the guide holes 11s and the grooves 11a and 11b can be arranged in the circumferential direction and a space for installing the brake unit 8 is formed in the center.

Embodiment 2

Figure 3:
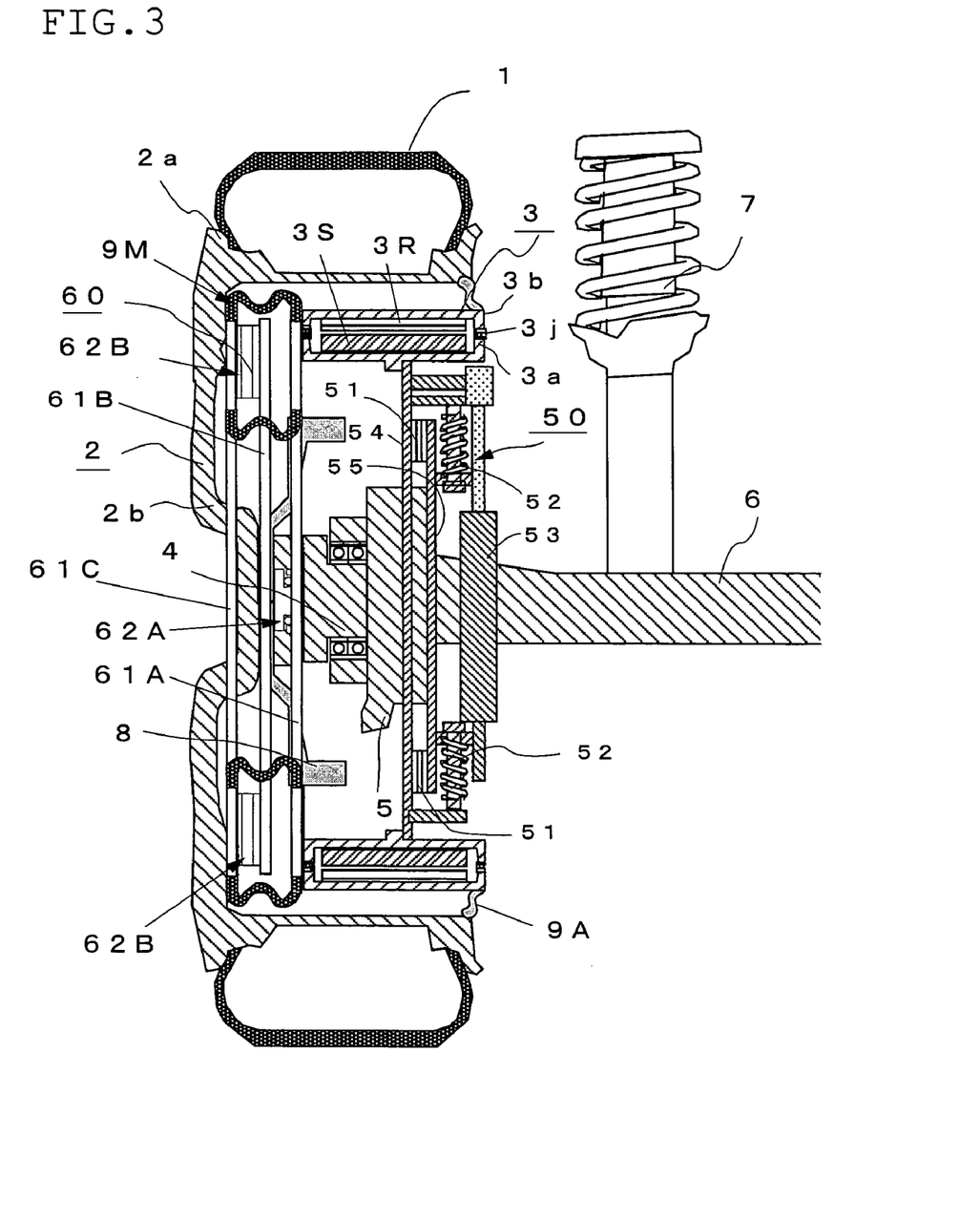
FIG. 3 is a longitudinal sectional view showing the constitution of an in-wheel motor system according to Embodiment 2 of the present invention.

FIG. 3 shows the constitution of an in-wheel motor system according to Embodiment 2. In FIG. 3, reference numeral 1 denotes a tire, 2 a wheel consisting of a rim 2a and a wheel disk 2b, and 3 an outer rotor type in-wheel motor which comprises a stator 3S fixed to a non-rotating side case 3a arranged on the inner side in the radial direction and a rotor 3R fixed to a rotating side case 3b rotatably connected to the above non-rotating side case 3a through a bearing 3j and arranged on the outer side in the radial direction.

Numeral 4 denotes a hub connected to the wheel 2 at its rotary shaft, 5 a knuckle connected to an axle 6, 7 a suspension member composed of a shock absorber, 8 a brake unit composed of a brake disk mounted to the above hub 4, 9A the first annular dust boot shown in FIG. 6, and 9M an elastic dust boot having a wavy section according to the present invention.

50 denotes a buffer mechanism for elastically supporting the non-rotating side case 3a supporting the stator 3 to the above knuckle 5, comprising two plates 54 and 55 whose moving directions are limited to the vertical direction of the vehicle by direct-acting guides 51 and which are interconnected by springs 52 and a damper 53 moving in the vertical direction of the vehicle, and 60 a flexible coupling comprising a plurality of hollow disk-like plates 61A to 61C interconnected by direct-acting guides 62A and 62B which are arranged in such a manner that their moving directions become orthogonal to each other.

Figure 4A:
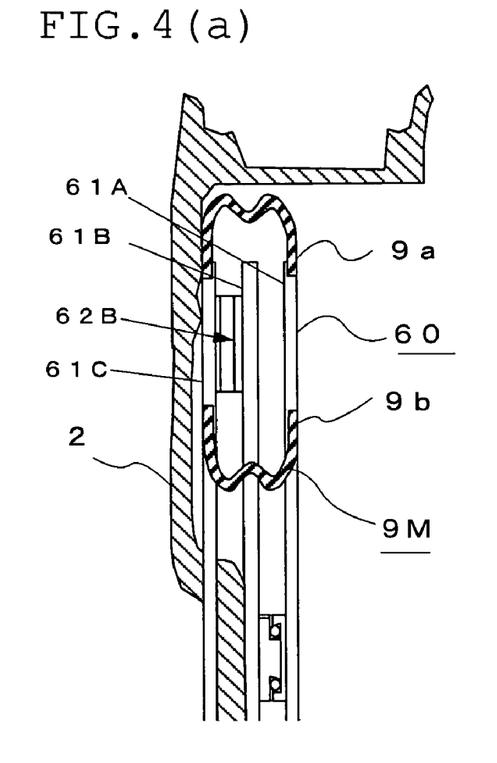
FIGS. 4(a) and 4(b) are diagrams showing the operation of a dust boot according to Embodiment 2.
Figure 4B:
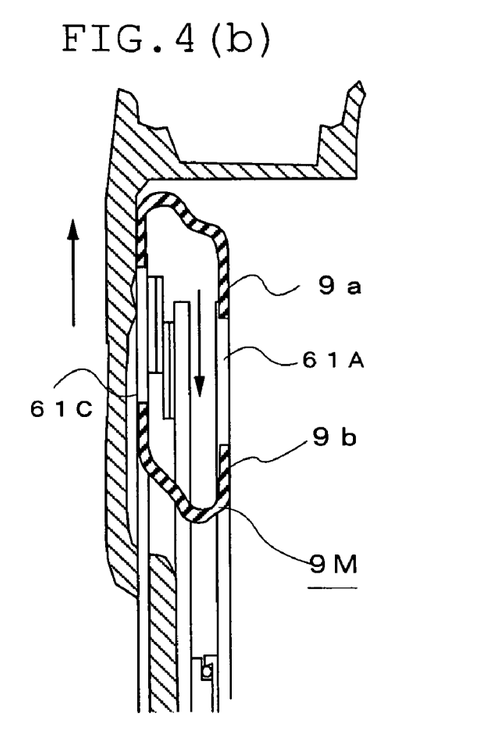

As shown in FIGS. 4(a) and 4(b), the above dust boot 9M comprises an annular boot 9a for covering the outer sides of the direct-acting guides 62A and 62B arranged in the circumferential directions of the hollow disk-like plates 61A to 61C of the above flexible coupling 60 and an annular boot 9b for covering the inner sides of the direct-acting guides 62A and 62B, and the both annular boots 9a and 9b are interposed between the motor-side plate 61A and the wheel-side plate 61C, thereby making it possible to protect the direct-acting guides 62A and 62B from the outside. That is, as barriers are formed on the inner sides and the outer sides of the direct-acting guides 62A and 62B of the above flexible coupling 60 by the above dust boot 9M, the deformation of the above coupling portion by a stepping stone and the entry of dust into the direct-acting guides 62A and 62B can be prevented and the leakage of grease filled into the slide portions of the direct-acting guides 62A and 62B which are a slide mechanism to the outside can be prevented.

Since the above dust boot 9M is an elastic member having a wavy section, it expands and contracts along with the movement of the flexible coupling 60. Therefore, unrequired force is not applied to the above flexible coupling 60, thereby making it possible to move the above flexible coupling 60 smoothly.

According to Embodiment 2, in the in-wheel motor system in which the non-rotating side case 3a of the motor 3 is connected to the knuckle 5 by the buffer mechanism 50 and the rotating side case 3a of the motor 3 is connected to the wheel 2 by the flexible coupling 60, the direct-acting guides 62A and 62B which are the slide mechanism of the above flexible coupling 60 are stored in the elastic dust boot 9M having a wavy section. Therefore, the entry of a stone or dust into the above direct-acting guides 62A and 62B can be prevented and the leakage of grease filled into the direct-acting guides 62A and 62B which are slide portions to the outside can be prevented, thereby making it possible to greatly improve the reliability of the in-wheel motor system.

In the above Embodiment 2, the direct-acting guides 62A and 62B which are the slide mechanism of the conventional flexible coupling 60 are stored in the dust boot 9M. The present invention is not limited to this. For example, the present invention can be applied when the slide mechanism used for a flexible coupling for connecting the in-wheel motor 3 to the wheel 2 or the hub 4 like the slide mechanism having small balls 11m, grooves 11a and 11b and guide holes 11s is stored.

Figure 5:
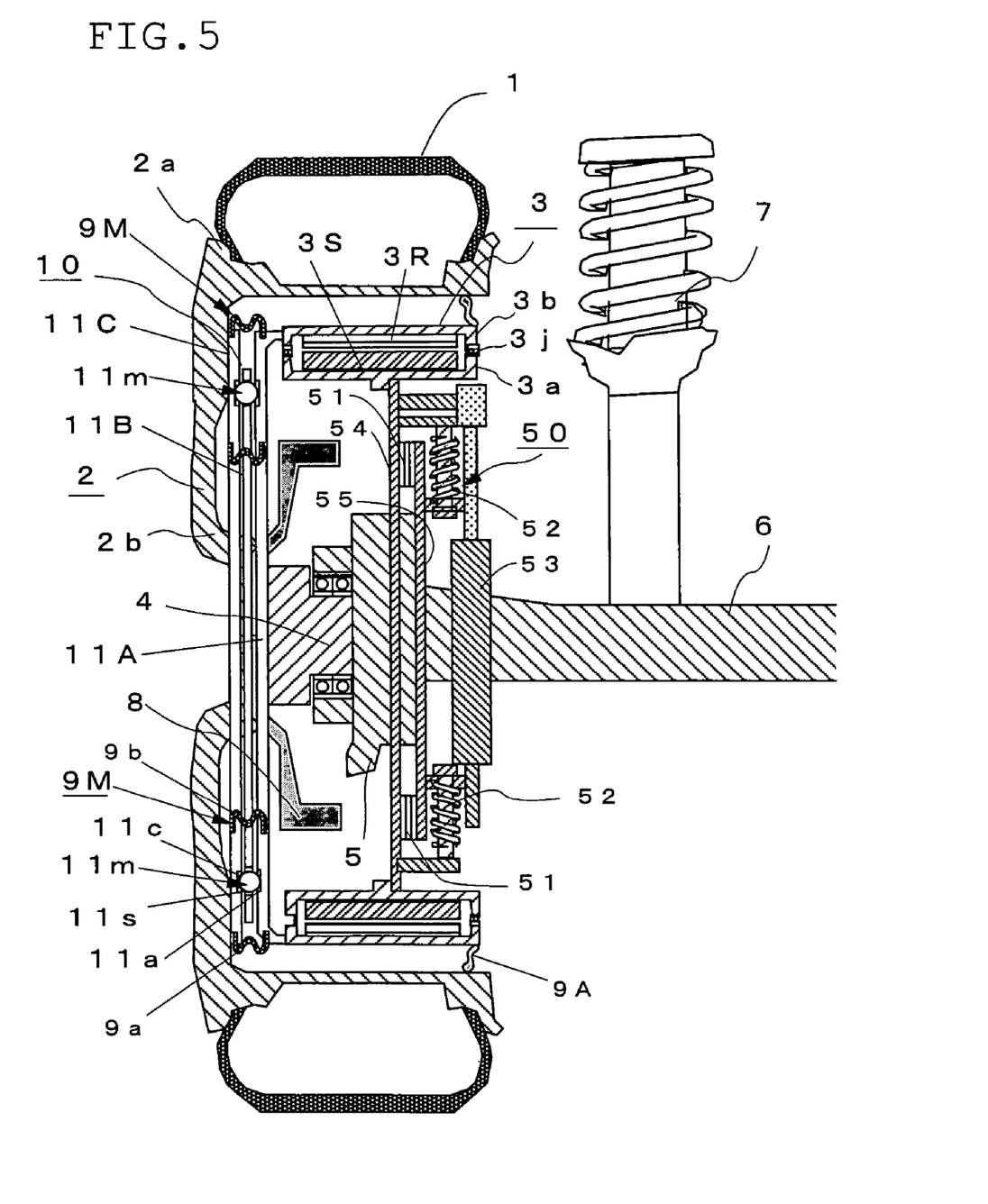
FIG. 5 is a longitudinal sectional view showing the constitution of an in-wheel motor system comprising a flexible coupling and a dust boot according to the present invention.

Stated more specifically, when the annular boot 9a for covering the outer sides of the small balls 11m, grooves 11a and 11b and guide holes 11s and the annular boot 9b for covering the inner sides of the small balls 11m, grooves 11a and 11b and guide holes 11s constituting the slide mechanism of the above flexible coupling 10 are installed between the motor-side plate 11A and the wheel-side plate 11C and the above slide mechanism is stored in the elastic dust boot 9M having a wavy section which comprises the above annular boots 9a and 9b as shown in FIG. 5, the entry of a stone or dust into the above slide mechanism can be prevented and the leakage of grease filled into the grooves 11a and 11b and the guide holes 11s which are the slide portions of the above slide mechanism to the outside can be prevented, thereby making it possible to greatly improve the reliability of the in-wheel motor system.

INDUSTRIAL FEASIBILITY

As having been described above, according to the present invention, since the rotor of the in-wheel motor and the wheel or the hub are interconnected by the flexible coupling which has a small number of parts and is easily assembled, productivity can be improved and the in-wheel motor can be manufactured at a low cost.

Since the slide mechanism of the coupling member is stored in an elastic annular dust boot, the entry of dust and water into the slide mechanism and the diffusion of grease filled into the slide portions of the above slide mechanism to the outside can be prevented effectively.

What is claimed is:

1. An in-wheel motor system having a hollow direct drive motor which is provided in a wheel and whose stator side is supported to a part around the wheel of a vehicle by at least one of elastic bodies and an attenuation mechanism, wherein a motor rotor and a wheel or a hub are interconnected by a coupling mechanism which comprises two hollow disk-like plates having a plurality of grooves formed on their opposed surfaces in the circumferential direction at an angle of 45° from the radial direction of the plates and extending in directions orthogonal to each other, small balls sandwiched between the grooves in such a manner that they can slide, an intermediate plate interposed between the hollow disk-like plates and-having guide holes for guiding the small balls in a direction orthogonal to the radial direction of the plates.

2. The in-wheel motor system according to claim 1 which comprises an elastic annular dust boot for storing a slide mechanism having the above small steels, grooves and guide holes.

* * * * *